US010976756B2

(12) United States Patent
Silvius et al.

(10) Patent No.: US 10,976,756 B2
(45) Date of Patent: Apr. 13, 2021

(54) GAS REGULATOR INTERNAL VENT LIMITING DEVICE

(71) Applicant: Honeywell International Inc., Morris Plains, NJ (US)

(72) Inventors: Philip Silvius, Nebraska City, NE (US); Austin Jesz, Nebraska City, NE (US)

(73) Assignee: Honeywell International Inc., Morris Plains, NJ (US)

( * ) Notice: Subject to any disclaimer, the term of this patent is extended or adjusted under 35 U.S.C. 154(b) by 55 days.

(21) Appl. No.: 16/185,510

(22) Filed: Nov. 9, 2018

(65) Prior Publication Data

US 2019/0155316 A1 May 23, 2019

Related U.S. Application Data

(60) Provisional application No. 62/590,015, filed on Nov. 22, 2017.

(51) Int. Cl.
*G05D 16/04* (2006.01)
*G05D 16/06* (2006.01)

(52) U.S. Cl.
CPC ..... *G05D 16/0402* (2019.01); *G05D 16/0636* (2013.01); *F23N 2235/14* (2020.01); *F23N 2235/18* (2020.01); *F23N 2235/20* (2020.01)

(58) Field of Classification Search
CPC .. F16K 31/126; F16K 31/1266; F16K 31/165; G05D 16/0402; G05D 16/0636; F23N 2235/14; F23N 2235/18; F23N 2235/20
See application file for complete search history.

(56) References Cited

U.S. PATENT DOCUMENTS

| 2,670,574 | A | * | 3/1954 | Schuster | G05D 16/0683 137/505.36 |
| 2,827,069 | A | * | 3/1958 | Peterson | G05D 16/0683 137/116.5 |
| 3,032,054 | A | * | 5/1962 | Irwin | G05D 16/0694 137/116.5 |
| 3,042,064 | A | * | 7/1962 | Pommersheim | F16K 31/165 137/116.5 |
| 3,488,685 | A | * | 1/1970 | Hughes | G05D 16/0683 137/116.5 |
| 3,705,599 | A | * | 12/1972 | Sheward | G05D 16/0688 137/116.5 |

(Continued)

*Primary Examiner* — Jessica Cahill
(74) *Attorney, Agent, or Firm* — Ortiz & Lopez, PLLC; Luis M. Ortiz; Kermit D. Lopez

(57) ABSTRACT

A pressure regulator is described. The pressure regulator includes a diaphragm, a vent limiting component, a relief valve stem, and a main spring. The diaphragm has an inner edge that defines a main relief opening. The vent limiting component is positioned within the main relief opening and adjacent to an upper side of the diaphragm about the inner edge. The vent limiting component defines an orifice, wherein the lower side of the diaphragm is in fluid communication with the upper side of the diaphragm through the orifice. The relief valve stem is positioned adjacent to a lower side of the diaphragm about the inner edge. The main spring is configured to provide a force to the vent limiting component to removably secure the vent limiting component to the diaphragm.

18 Claims, 8 Drawing Sheets

Cross Section Standard
1800B2 Relieving Regulator

(56) References Cited

U.S. PATENT DOCUMENTS

| | | | | |
|---|---|---|---|---|
| 3,892,255 | A * | 7/1975 | Johnson | G05D 16/0683 137/116.5 |
| 8,256,446 | B2 * | 9/2012 | Hawkins | F16K 31/165 137/116.5 |
| 8,256,452 | B2 * | 9/2012 | Hawkins | G05D 16/0688 137/505.46 |
| 10,302,209 | B2 * | 5/2019 | Hawkins | F16K 17/048 |
| 10,612,680 | B2 * | 4/2020 | Hawkins | F16K 17/0413 |
| 2012/0111425 | A1 * | 5/2012 | Hawkins | G05D 16/0683 137/489 |

* cited by examiner

Cross Section Standard
1800B2 Relieving Regulator

GAS REGULATOR INTERNAL VENT LIMITING DEVICE

CROSS-REFERENCE TO RELATED APPLICATIONS

This application claims the benefit of U.S. provisional application No. 62/590,015, filed Nov. 22, 2017, the disclosure of which is incorporated herein by reference in its entirety.

TECHNICAL FIELD

The present invention relates to a metering system and method, and more particularly, to an internal vent limiting device for a gas regulator.

BACKGROUND

Users of gas pressure regulators are increasingly being restricted on location of regulator installations by government regulations. Customers are actively seeking products to control volume of gas released to atmosphere (vented) during operation, which allows flexibility in meeting the government mandates.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Conventional gas pressure regulators limit relief through a regulator vent via one of two methods: 1.) Restrict flow via orifice at a vent outlet; and 2.) Install a secondary diaphragm with calibrated opening in the second diaphragm to control flow.

Method 1.) hinders normal regulator operation by also restricting normal inflow/outflow of air as the regulator travels, to the possible detriment of performance. This style of restrictor is also sensitive to a level orientation at assembly, thereby limiting installation flexibility.

With method 2.), while effective in capturing and metering vented gas, it is hypothesized added stiffness of a second diaphragm may affect product performance as compared to published performance based on a single diaphragm.

The present invention overcomes both of these performance issues as an add-on, optional vent limiting component to a standard pressure regulator. The vent limiting component allows for use of a conventional single diaphragm, is unaffected by installation positioning, and does not restrict air egress during standard operation. In addition to the drawbacks of the alternative solutions described above, the alternative solutions command premium prices in the marketplace. The addition of the vent limiting component to a pressure regulator, as described herein, allows for minimal added cost to existing product.

An aspect of the present disclosure provides:

A pressure regulator comprising: a diaphragm having an inner edge, the inner edge defining a main relief opening; a vent limiting component positioned within the main relief opening and adjacent to an upper side of the diaphragm about the inner edge; a relief valve stem positioned adjacent to a lower side of the diaphragm about the inner edge; and a main spring configured to provide a force to the vent limiting component to removably secure the vent limiting component to the diaphragm.

The pressure regulator may also comprise a gasket extending about the inner edge of the diaphragm, the gasket being positioned between a flange of the vent limiting component and the diaphragm.

The vent limiting component defines an orifice, wherein the lower side of the diaphragm is in fluid communication with the upper side of the diaphragm through the orifice.

Another aspect of the present disclosure provides a vent assembly for a pressure regulator. The vent assembly comprises a diaphragm and a vent limiting component. The diaphragm defines a main relief opening, and the vent limiting component is positioned within the main relief opening. The vent limiting component includes an upper portion and a lower portion. The lower portion is positioned circumferentially about the upper portion and includes a base, a sidewall, and a flange. The base extends in a radial direction from the upper portion. The sidewall extends at least partially in the radial direction from the base. The flange that extends in the radial direction from the sidewall. The base defines an orifice extending therethrough that fluidly couples a bottom surface of the diaphragm with an upper surface of the diaphragm.

Another aspect of the present disclosure provides a vent limiting component for a pressure regulator. The vent limiting component comprises an upper portion and a lower portion. The lower portion is positioned circumferentially about the upper portion and includes a base, a sidewall, and a flange. The base extends in a radial direction from the upper portion. The sidewall extends at least partially in the radial direction from the base. The flange extends in the radial direction from the sidewall. The base defines an orifice extending therethrough that fluidly couples a bottom surface of the lower portion with an upper surface of the lower portion.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DESCRIPTION OF THE INVENTION

Figure 1:
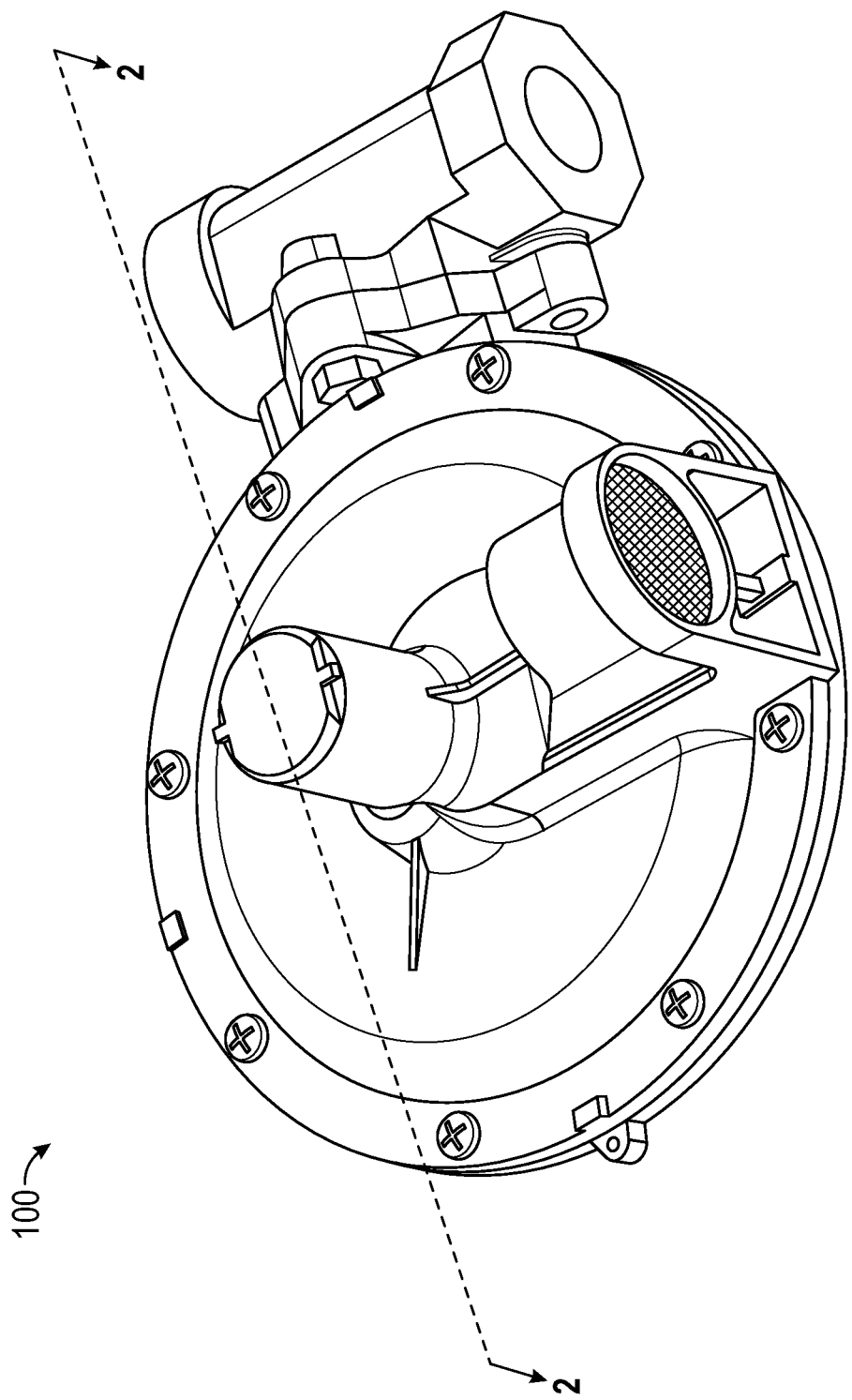
FIG. 1 illustrates a perspective view of a pressure regulator, according to an aspect of this disclosure.

A pressure regulator with a vent limiting component place within is described. The vent limiting component may be an optional add-on component. The vent limiting component may be incorporated into the pressure regulator with minimal to no modifications to existing regulator parts. The vent limiting component captures any gas flowing through an existing pressure relief opening and meters it through a calibrated orifice to control released gas/fluid flow below limits established by existing product design standards.

Certain terminology is used in the description for convenience only and is not limiting. The words "upward", "downward", "below", "above", "upper", "lower", "longitudinal", "axial", "radial," and "transverse" designate directions in the drawings to which reference is made. The term "substantially" is intended to mean considerable in extent or largely but not necessarily wholly that which is specified. The terminology includes the above-listed words, derivatives thereof and words of similar import.

The vent limiting component may be injection molded from engineered polymers (plastics). It will be appreciated that the vent limiting component may also comprise cast or machined metal, ceramics, or other materials commonly used for components of pressure regulators. The vent limiting component may include a circular shape that concentrically nests in a main relief opening already present in a diaphragm plate assembly of a conventional pressure regulator, for example, a 1800B2 series regulator, or other regulator product currently in production. In addition to the vent limiting component, a gasket may be provided. A regulator main spring retains the vent limiting component and provides compressive force for a seal to capture all gas through the main relief opening.

Figure 2:
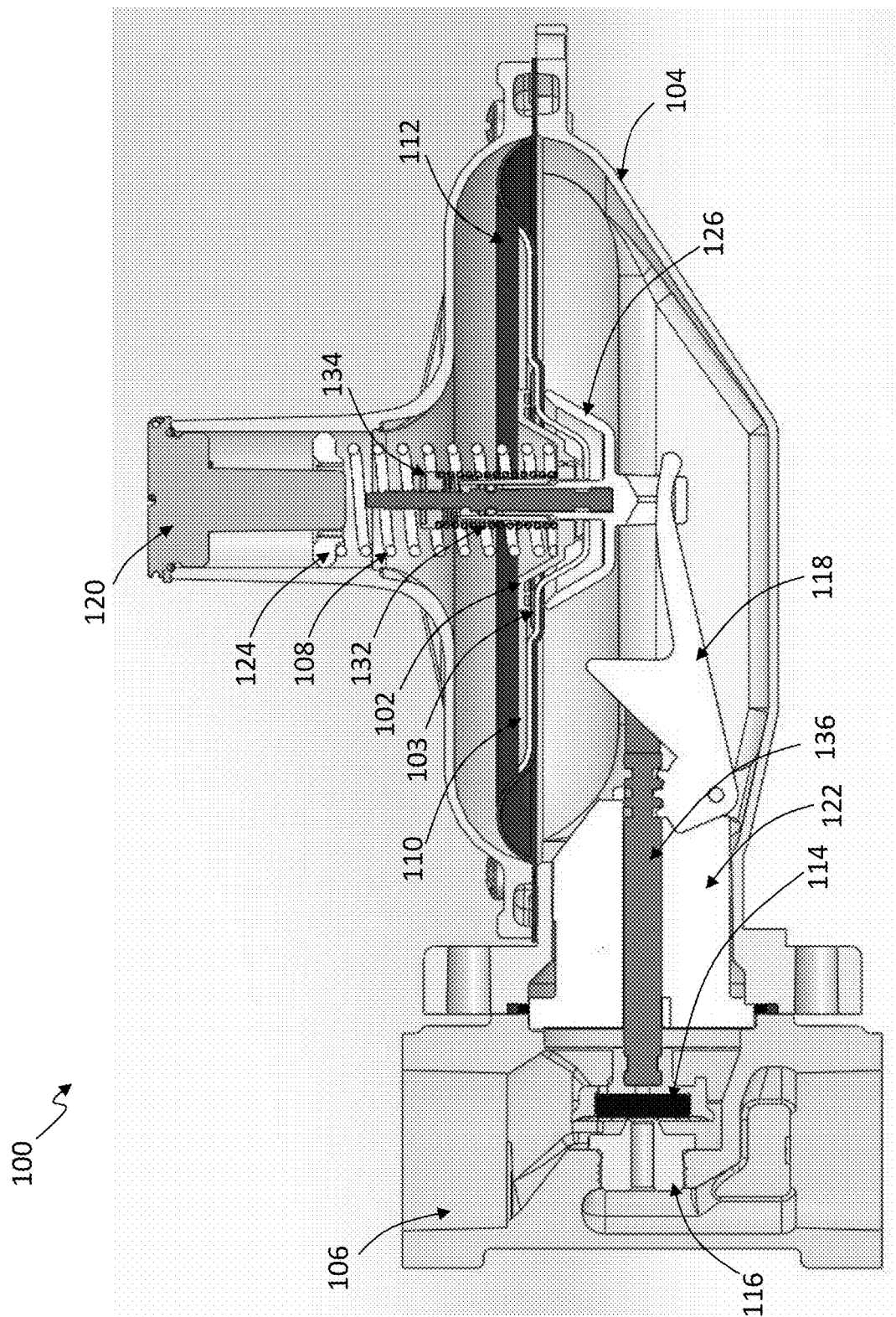
FIGS. 2 and 3 are cross-sectional views of the pressure regulator shown in FIG. 1 taken along line 2-2 in a closed position and an open position, respectively, according to aspects of this disclosure.
Figure 3:
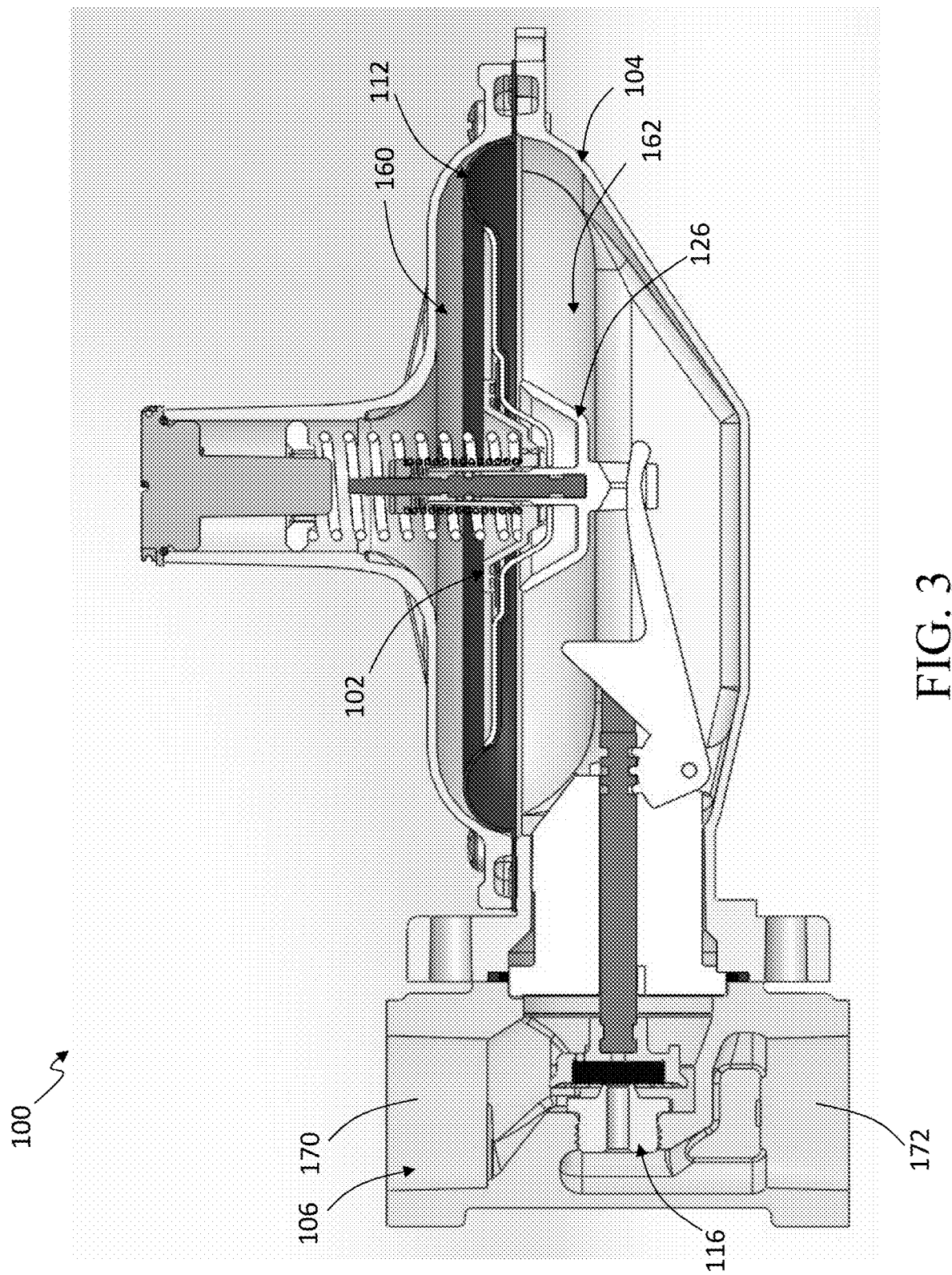

FIG. 1 illustrates a pressure regulator 100, according to an aspect of this disclosure. FIGS. 2 and 3 illustrate cross-sectional views of the pressure regulator 100 in a closed position and an open position, respectively, taken along line 2-2 in FIG. 1. The regulator 100 comprises a vent limiting component 102, a gasket 103, a diaphragm case 104, a valve body 106, a resilient member 108 (e.g. pressure spring or main spring), a diaphragm plate 110, a diaphragm 112, a seat disk 114, an orifice valve 116, a lever 118, a seal plug 120, a plunger guide 122, a pressure adjustment screw 124, a relief valve stem 126, a vent screen (not visible in figures), a vent valve (not visible in figures), a relief resilient member 132 (e.g. relief valve spring), a relief valve adjustment nut 134, and a plunger 136. It will be appreciated that fewer or more components may be incorporated into the pressure regulator 100.

Figure 4:
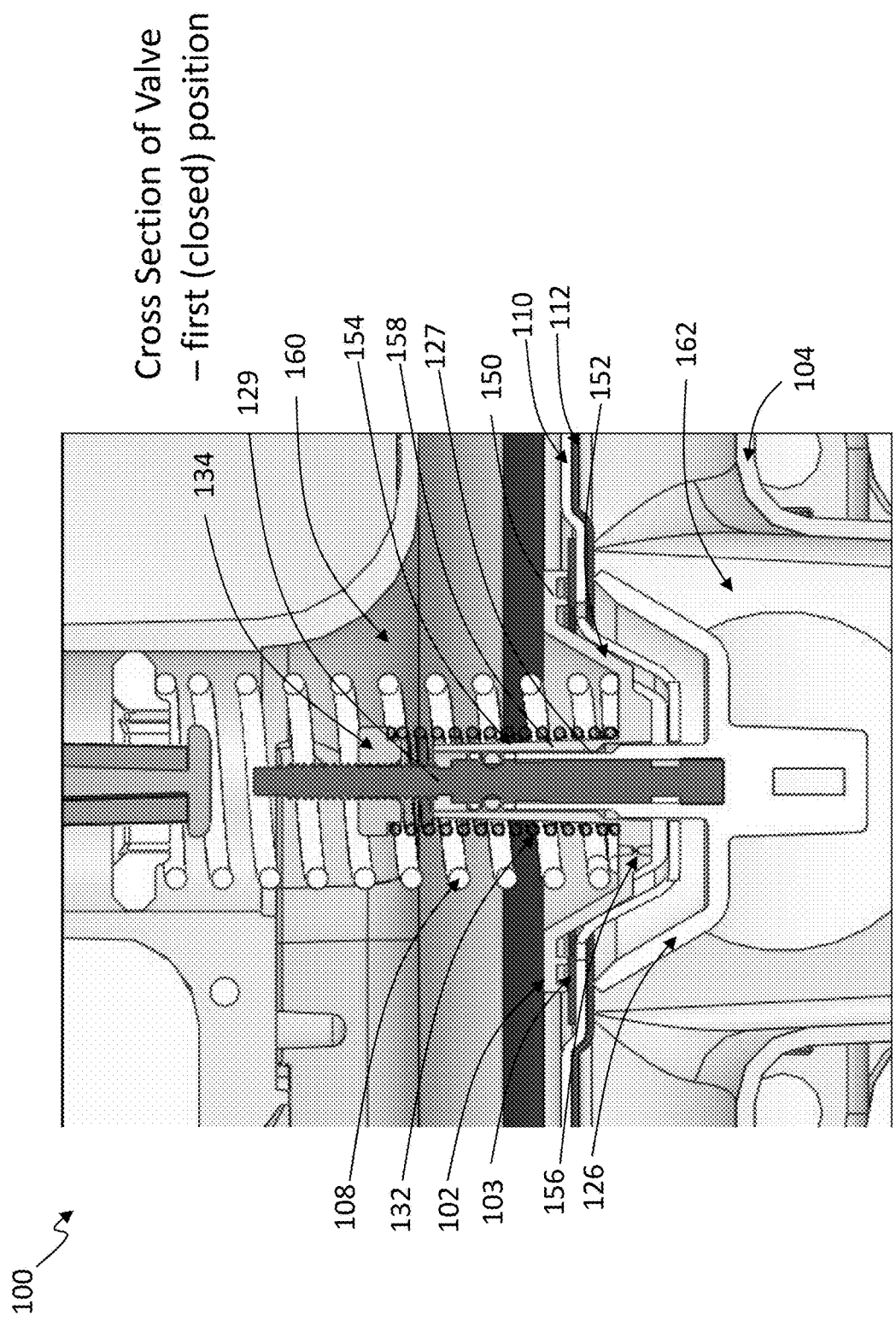
FIGS. 4 and 5 are cross-sectional views of portions the pressure regulator shown in FIG. 1 taken along line 2-2 in a closed position and an open position, respectively, according to aspects of this disclosure.
Figure 5:
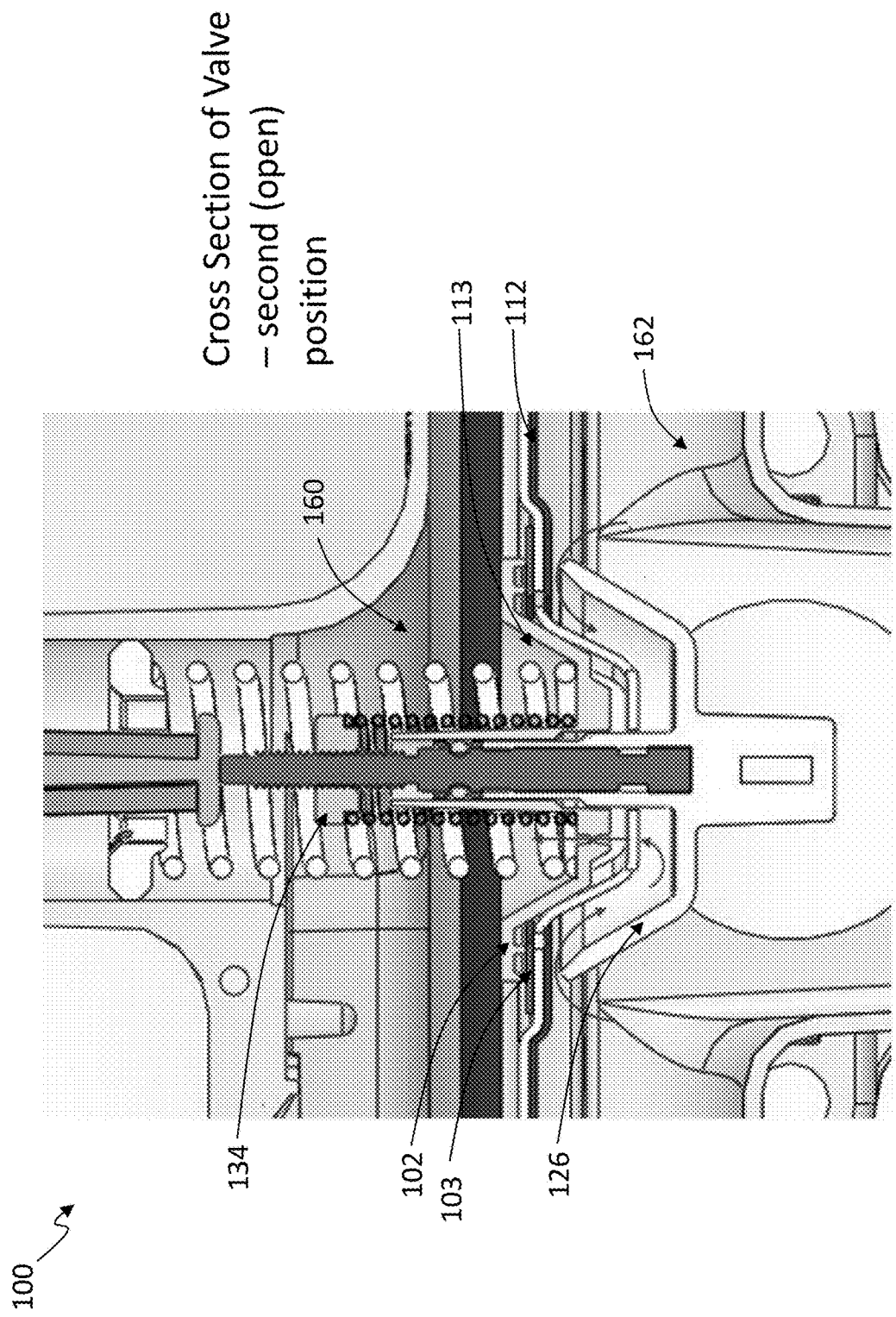

FIGS. 4 and 5 illustrate close-up cross-sectional views of portions of the pressure regulator 100 in a closed position and an open position, respectively. The gasket 103 extends circumferentially about the pressure spring 108 and the relief valve spring 132. The gasket 103 is positioned on top of the diaphragm plate 110, which is on top of the diaphragm 112. The vent limiting component 102 is positioned at least partially on top of the gasket 103. A flange 150 of the vent limiting component 102 is sealed against a topside of the gasket 103 such that fluid communication is substantially prevented between the flange 150 of the vent limiting component 102 and the diaphragm plate 110. The pressure spring 108 is configured to provide a force onto an upper side of the vent limiting component 102 to seal the flange 150 against the gasket 103. In an aspect, the gasket 103 comprises an elastomeric material.

The diaphragm 112 includes an outer edge that extends circumferentially about the diaphragm 112. The circumferential edge is secured to the diaphragm case 104, such that fluid flow through the diaphragm 112 from the lower portion 162 to the upper portion 160 of the diaphragm case is substantially prevented at the circumferential edge of the diaphragm 112. The diaphragm 112 further includes an inner edge that defines a main relief opening 113. The diaphragm may comprise a flexible material, for example, a rubber or a material with properties similar to rubber.

Figure 6:
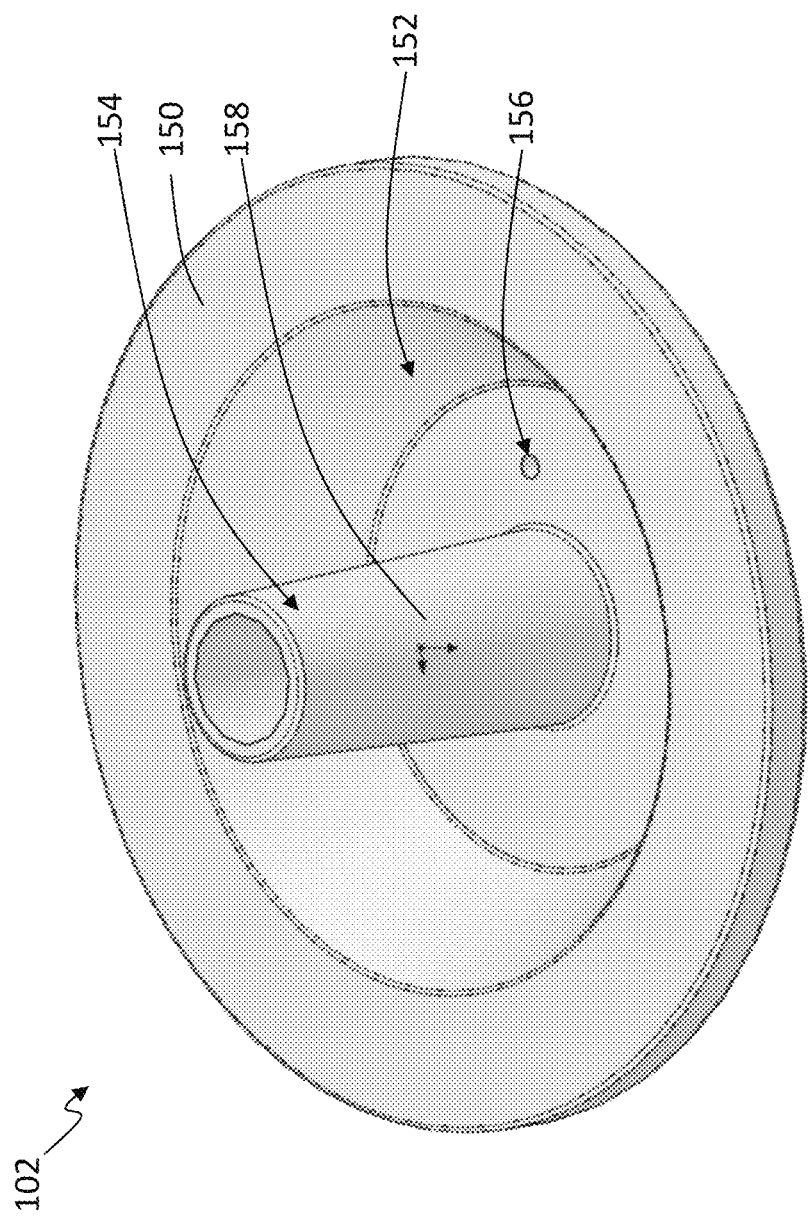
FIG. 6 illustrates a vent limiting component for a pressure regulator, according to an aspect of this disclosure.

FIG. 6 illustrates a perspective view of the vent limiting component 102. The vent limiting component 102 includes a lower portion 152 and an upper portion 154. The flange 150 extends outward from the lower portion 152 and above the main relief opening 113 of the diaphragm 112. The lower portion 152 defines an orifice 156 that extends through the lower portion 152. The orifice 156 fluidly couples a bottom surface of the vent limiting component 102 to an upper surface of the vent limiting component 102. In an aspect, the orifice 156 has a diameter of approximately 0.020 inches. The lower portion 152 is positioned within the main relief opening 113, such that at least a portion of the vent limiting component 102 is positioned below the main relief opening 113. The upper portion 154 defines a tower 158 (e.g. a hollow cylindrical body). In an aspect, the tower 158 extends from the lower portion 152 through the main relief opening 113 of the diaphragm 112.

In the closed position (FIG. 4) of the pressure regulator 100, an upper portion of the relief valve stem 126 is in contact with a lower surface of the diaphragm 112, such that fluid communication between the upper portion 160 and the lower portion 162 of the diaphragm case 104 is substantially prevented between the relief valve stem 126 and the diaphragm 112. The relief valve stem 126 includes a stem tower 127 that extends through the tower 158 defined by the vent limiting component 102. The stem tower 127 is slideably engaged with an inner surface of the tower 158. In an aspect, the stem tower 127 may include o-rings on an outer surface to substantially prevent fluid flow through the tower 158. The stem tower 127 may be coupled to a threaded member 129 that extends upward from the stem 127. The threaded member 129 is coupled to the relief valve adjustment nut 134. In an aspect, the relief valve adjustment nut 134 is threadedly coupled to the threaded member 129 such that rotation of the relief valve adjustment nut 134 causes the nut 134 to move in an upward or downward direction relative to the threaded member 129. The relief resilient member 132 is positioned between the adjustment nut 134 and the upper surface of the vent limiting component 102.

In the open position (FIG. 5) of the pressure regulator 100, the upper portion of the relief valve stem 126 is spaced from the lower surface of the diaphragm 112, such that the upper portion 160 of the diaphragm case 104 and the lower portion 162 of the diaphragm case 104 are in fluid communication through the main relief opening 113. A gas within the lower portion 162 flows through a main relief opening, into the upper portion 160. The upper portion 160 of the diaphragm case 104 is in fluid communication with the atmosphere, such that in the open position of the regulator 100, fluid may flow from the lower portion 162 of the diaphragm case 104 to atmosphere via the upper portion 160 of the diaphragm case 104. In an aspect, the diaphragm case 104 includes a vent screen (not shown) that fluidly couples the upper portion 160 of the diaphragm case 104 to atmosphere. The pressure regulator 100 transitions from the closed position to the open position when a pressure of the fluid within the pressure regulator 100 exceeds compressive forces of the pressure spring 108 and the relief valve spring 132.

Referring to FIG. 3, the valve body 106 includes an upper channel 170 and a lower channel 172. The upper channel 170 is in fluid communication with the lower portion 162 of the diaphragm case 104. The lower channel 172 is in fluid communication with the upper channel 170 via the orifice valve 116. For example, when the orifice valve 116 is in an open position the lower channel 172 and the upper channel 170 are in fluid communication, and when the orifice valve 116 is in a closed position fluid communication between the lower channel 172 and the upper channel 170 is substantially prevented. In the closed position of the orifice valve 116, the orifice valve 116 seats against the seat disk 114.

The orifice valve 116 is operatively coupled to the plunger 136 and the lever 118. The lever is coupled to a lower portion of the relief valve stem 126. Movement of the relief valve stem 126 in an upward direction causes the orifice valve 116 to transition to the closed position and seat against the seat disk 114. Movement of the relief valve stem 126 in a downward direction causes the orifice valve 116 to transition to the open position and space apart from the seat disk 114.

The pressure regulator 100 may be installed in a general pipeline such that the upper channel 170 is in fluid communication with a low pressure source and the lower channel 172 is in fluid communication with a high pressure source. The low pressure source is in fluid communication with the lower portion 162 of the diaphragm case 104 via the upper channel 170. During a standard operation of the pressure regulator 100, as the pressure within the upper channel 170 increases, the diaphragm 112 and the relief valve stem 126 move in an upward direction together such that the upper portion of the relief valve stem 126 is in contact with the lower surface of the diaphragm 112, maintaining the pressure regulator in the closed position. If the pressure in the lower portion 162 of the diaphragm case 104 exceeds a predetermined pressure threshold, the pressure regulator 100 transitions to the open position such that the upper portion of the relief valve stem 126 is spaced apart from the lower surface of the diaphragm 112. In an aspect, the diaphragm 112 and the relief valve stem 126 move in the upward direction together until the threaded member 129 contacts the seal plug 120. At this point, the diaphragm 112 continues to move in the upward direction relative to the relief valve stem 126.

When the pressure regulator 100 is in the open position, the pressure within the upper channel 170 is released to atmosphere from the lower portion 162 of the diaphragm case 104 through the orifice 156 of the vent limiting component 102. In the open position of the pressure regulator 100, the orifice valve 116 is seated against the seat disk 114 substantially preventing fluid communication between the high pressure source and the low pressure source.

As the pressure within the upper channel 170 decreases to a pressure below the predetermined pressure threshold, the diaphragm 112 lowers and contacts the upper portion of the relief valve stem 126 closing the pressure regulator 100. It will be appreciated that during standard operation of the pressure regulator 100, minor pressure fluctuations within the upper channel 170 may result in movement of the diaphragm 112 and the relief valve stem 126 without transitioning the pressure regulator 100 to the open position. The fluctuations of the diaphragm 112 and the relief valve stem 126 may occur until the pressure within the upper channel 170 exceeds the predetermined pressure threshold, at which point the pressure regulator 100 transitions to the open position. During the pressure fluctuations, the orifice valve 116 transitions between open and closed positions. For example, when the pressure within the upper channel 170 decreases, the relief valve stem 126 moves in the downward direction causing the orifice valve 116 to transition to the open position. When the orifice valve 116 is in the open position, the high pressure from the high pressure source is transferred to the upper channel 170 increasing the pressure within the upper channel 170. As the pressure within the upper channel 170 increases, the relief valve stem moves in the upward direction causing the orifice valve 116 to transition to the closed position.

During standard operation of the pressure regulator 100, when the pressure within the upper channel 170 exceeds the predetermined pressure threshold the pressure regulator 100 is transitioned to the open position which relieves the pressure within the upper channel 170 to atmosphere. If the pressure within the upper channel 170 drops to below a lower limit predetermined pressure threshold, the orifice valve 116 is transitioned to the open position to increase the pressure within the upper channel 170 until the pressure is above the lower limit predetermined pressure threshold. After the pressure within the upper channel 170 increases above the lower limit predetermined pressure threshold, the orifice valve 116 transitions to the closed position. A purpose of the pressure regulator 100 is to maintain a substantially constant pressure within the upper channel 170.

During a non-standard operation, such as, for example, a blockage in the orifice valve 116 that restricts the orifice valve 116 from fully closing, the high pressure source continuously transfers the high pressure gas through the lower channel 172 to the upper channel 170. This increases the pressure within the upper channel 170 while restricting the relief valve stem 126 from moving in the upward direction with the diaphragm 112, which causes the pressure regulator 100 to transition to, or remain in, the open position. While the blockage remains, the high pressure gas from the lower channel 172 flows through the orifice valve 116 out to atmosphere through the upper channel 170, the lower portion 162 of the diaphragm case 104, the orifice 156 of the vent limiting component 102, and the upper portion 160 of the diaphragm case 104. In an aspect, the pressure regulator 100 may include a sensor (not shown) configured to indicate when a non-standard operation occurs.

The orifice 156 of the vent limiting component 102 is calibrated to control a flow rate of gas from the lower portion 162 of the diaphragm case 104 to the upper portion 160 of the diaphragm case 104. For example, a size of the orifice 156 is selected to limit the flow rate of gas through the pressure regulator 100. In an aspect, the orifice 156 is calibrated to release less than approximately 10 cubic feet per hour of gas. In an alternative aspect, the orifice 156 is calibrated to release less than 5 cubic feet per hour of gas. In another alternative aspect, the orifice 156 is calibrated to release less than 2 cubic feet per hour of gas. It will be appreciated that in alternative aspects, the vent limiting component 102 may include more than one orifice 156 configured to control the flow rate of gas from the lower portion 162 to the upper portion 160 of the diaphragm case 104.

The pressure regulator 100 may be configured to relieve pressures that exceed a pressure limit of approximate 5 psi. For example, the predetermined pressure threshold may be 5 psi, such that gas pressure within the upper channel 170 that exceeds 5 psi would cause the pressure regulator 100 to transition to the open position. The predetermined pressure threshold value is the difference between the pressure in the lower portion 162 of the diaphragm case 104 and the upper portion 160 of the diaphragm case 104. In an alternative aspect, the predetermined pressure threshold is 2 psi.

Figure 7:
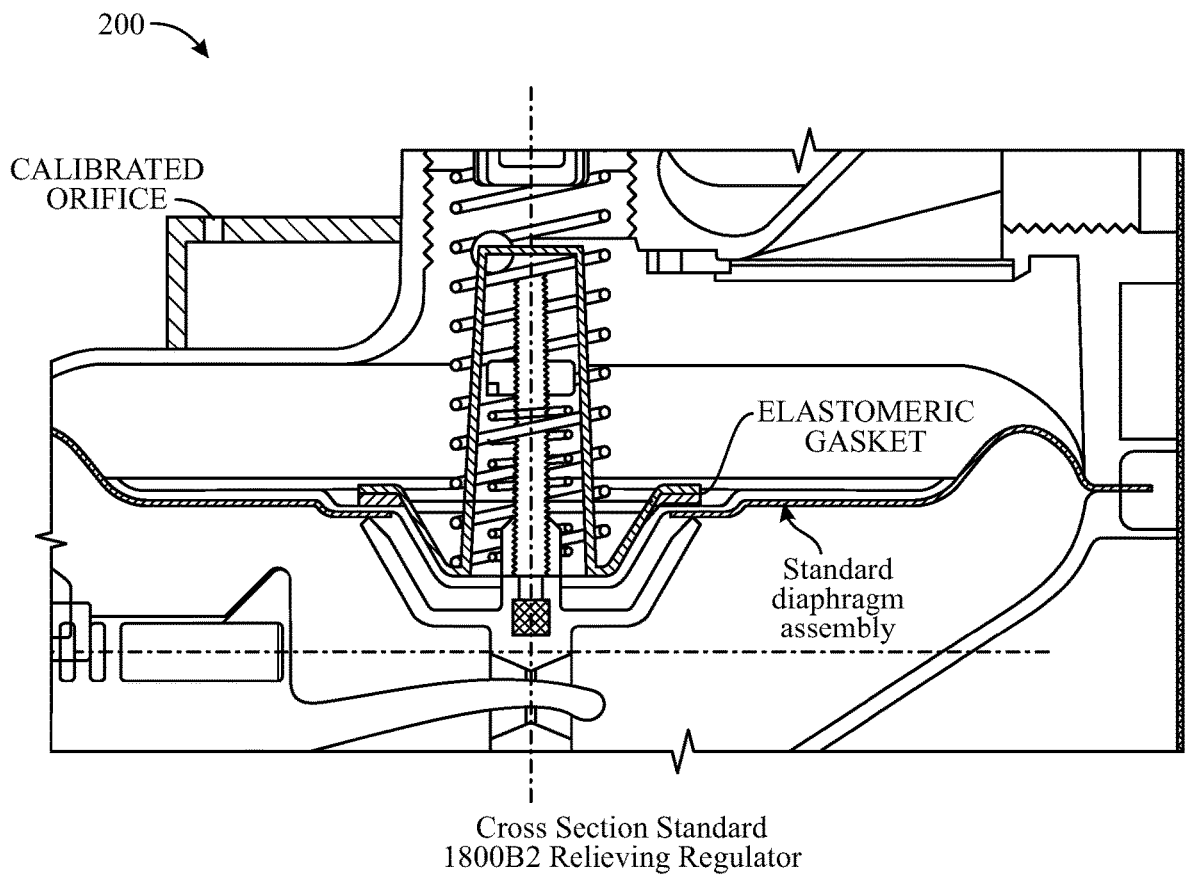
FIGS. 7 and 8 illustrate alternate aspects of a pressure regulator, according to aspects of this disclosure.
Figure 8:
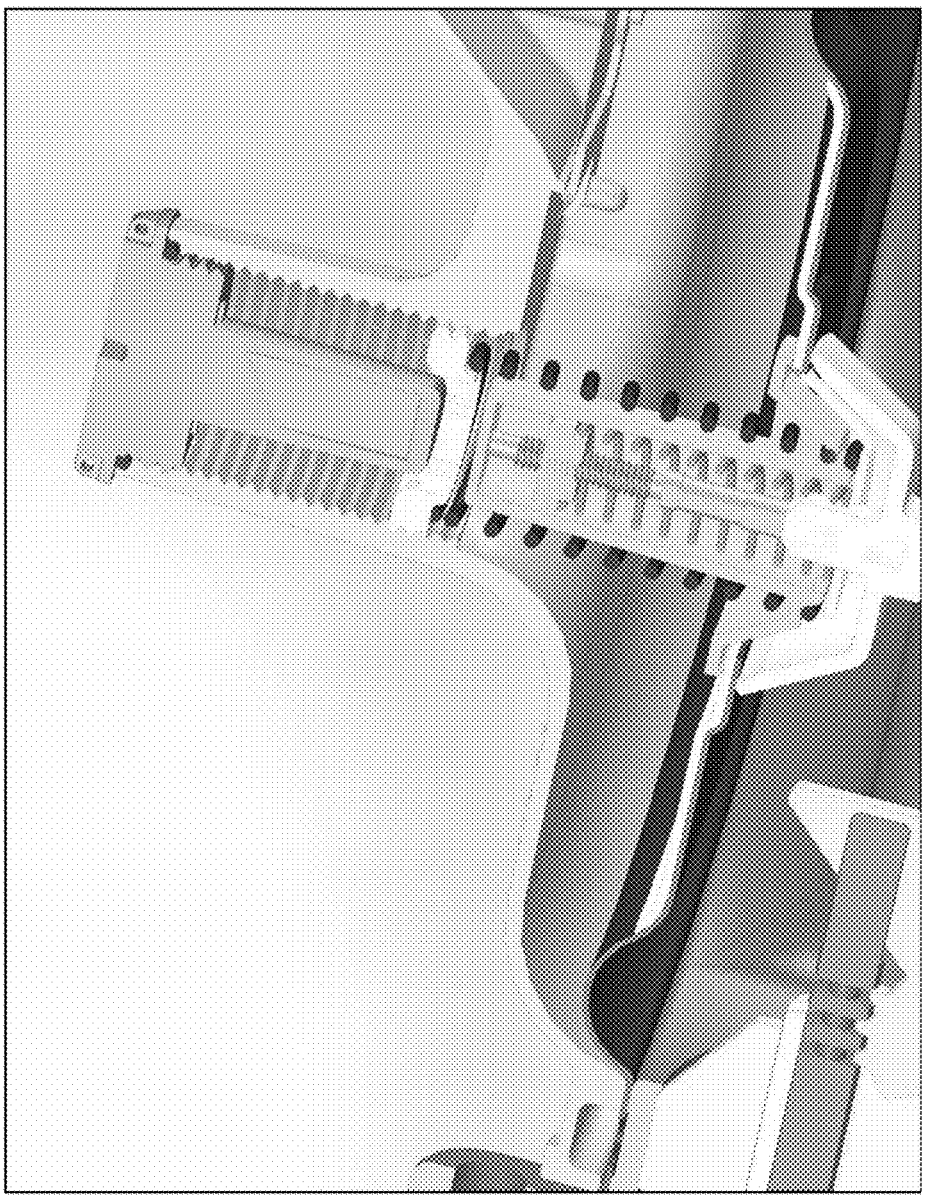

FIGS. 7 and 8 illustrate alternate aspects of a pressure regulator 200.

The pressure regulators 100 and 200 may be widely used in both civil and industrial installations using natural gas, liquefied petroleum gas (LPG), or other non-corrosive gases. The pressure regulators 100 and 200 may be directly installed to a gas meter or used in a general pipeline. The pressure regulators 100 and 200 may be mounted in any position desired. The pressure regulators 100 and 200 result in a precise and accurate pressure regulation.

The following includes a sample test run:

Test Objective:

Determine relief capacity of prototype limiting device at various expected relief pressures.

Samples:

1813B2 with prototype limited relief device & cap, ⅛" orifice, 5.5-8.5" spring (P044) & 2 psi (P060) spring.

1813B2 with prototype limited relief device & specially modified RV stem, ⅛" orifice, 5.5-8.5" spring (P044) & 2 psi (P060) spring Equipment:

Flow bench, low rate flow meter (<10 scfh)

Test Procedure:

Assemble 1813B2 regulator with prototype vent limiting device and cap. Install ⅛" orifice and 5.5-8.5" spring Set to 7" outlet using 50 psi inlet, 50 scfh flow Instrument vent with low rate flow measurement device.

Block downstream valve, and configure to introduce documented backpressure.

Backpressure at 17" wc, then record flow rate through vent connection after 30 sec of relief.

Increase backpressure to 2 psi, then recorded flow rate through vent connection after 30 sec of relief.

Reconfigure with 2 psi spring. Set to 2 psi outlet using 50 psi inlet, 50 scfh flow.

Block downstream valve, and configure to introduce documented backpressure.

Backpressure at 3.7 psi, then record flow rate through vent connection after 30 sec of relief.

Increase backpressure to 5 psi, then recorded flow rate through vent connection after 30 sec of relief.

Repeat entire test using specially modified regulator.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A vent limiting component for a pressure regulator, the vent limiting component comprising:
   an upper portion defining a tower comprising a hollow cylindrical body;
   a lower portion positioned circumferentially about the upper portion, the lower portion including a base extending in a radial direction from the upper portion, a sidewall extending at least partially in the radial direction from the base, and a flange that extends in the radial direction from the sidewall, wherein the base defines an orifice extending therethrough that fluidly couples a bottom surface of the vent limiting component with an upper surface of the vent limiting component,
   wherein the lower portion of the vent limiting component is positioned within a main relief opening of a diaphragm of the pressure regulator, such that at least a portion of the vent limiting component is positioned below the main relief opening, and
   wherein the tower extends from the lower portion through the main relief opening of the diaphragm of the pressure regulator.

2. The vent limiting component of claim 1, wherein the upper portion includes the hollow cylindrical body, which extends in an axial direction from the upper surface of the lower portion, the axial direction being substantially perpendicular to the radial direction, the hollow cylindrical body defining a channel extending therethrough that aligns with an opening defined in the base of the lower portion.

3. The vent limiting component of claim 2, wherein the orifice is located at a position on the base that is radially off-center from a radial center of the vent limiting component.

4. The vent limiting component of claim 3, wherein the hollow cylindrical body is located at the radial center of the vent limiting component.

5. The vent limiting component of claim 1, further comprising a plunger, a lever and an orifice valve, wherein the orifice valve is associated with the orifice and wherein the orifice valve is operatively coupled to the plunger and the lever.

6. The vent limiting component of claim 5, wherein the orifice is calibrated to control a flow rate of fluid through the orifice, the lever coupled to a lower portion of a relief valve stem, and wherein a movement of the relief valve stem in an upward direction causes the orifice valve to transition to a closed position and seat against a seat disk, and wherein a movement of the relief valve stem in a downward direction causes the orifice valve to transition to an open position and space apart from the seat disk.

7. A vent assembly for a pressure regulator, the vent assembly comprising:
   a diaphragm defining a main relief opening; and
   a vent limiting component positioned within the main relief opening, the vent limiting component including:
   an upper portion, and a lower portion positioned circumferentially about the upper portion, the upper portion defining a tower comprising a hollow cylindrical body;
   the lower portion including a base extending in a radial direction from the upper portion, a sidewall extending at least partially in the radial direction from the base, and a flange that extends in the radial direction from the sidewall, wherein the base defines an orifice extending therethrough that fluidly couples a bottom surface of the diaphragm with an upper surface of the diaphragm,
   wherein the lower portion of the vent limiting component is positioned within the main relief opening of the diaphragm of the pressure regulator, such that at least a portion of the vent limiting component is positioned below the main relief opening, and
   wherein the tower extends from the lower portion through the main relief opening of the diaphragm of the pressure regulator.

8. The vent assembly of claim 7, further comprising: a resilient member configured to provide a force to the vent limiting component to removably secure the vent limiting component to the diaphragm.

9. The vent assembly of claim 8, further comprising: a relief valve stem positioned adjacent to the bottom surface of the diaphragm about the main relief opening, wherein in a closed position of the vent assembly the relief valve stem is in contact with the bottom surface of the diaphragm substantially preventing fluid flow through the orifice of the vent limiting component, and wherein in an open position of the vent assembly the relief valve stem is spaced apart from the bottom surface of the diaphragm allowing fluid flow through the orifice of the vent limiting component.

10. The vent assembly of claim 9, wherein the upper portion of the vent limiting component includes the hollow cylindrical body, which extends in an axial direction from an upper surface of the lower portion, the axial direction being substantially perpendicular to the radial direction, the hollow cylindrical body defining a channel extending therethrough that aligns with an opening defined in the base of the lower portion, and wherein the relief valve stem includes a stem tower that extends through the opening and through the channel of the vent limiting component, the extension being axially slidable within the channel.

11. The vent assembly of claim 10, wherein the resilient member is a first resilient member, the vent assembly further comprising: a second resilient member; and an adjustment nut positioned on the extension of the relief valve stem, wherein the second resilient member is positioned between the adjustment nut and the upper surface of the lower portion of the vent limiting component, the adjustment nut being movable in 1.) the axial direction to decrease a force applied by the second resilient member onto the vent limiting component, and 2.) a direction opposite the axial direction to increase a force applied by the second resilient member onto the vent limiting component.

12. The vent assembly of claim 9, further comprising a plunger, a lever, and an orifice valve associated with the orifice, wherein the orifice is calibrated to control a flow rate of fluid through the orifice, wherein the orifice valve is operatively coupled to the plunger and the lever, wherein the lever is coupled to a lower portion of the relief valve stem, wherein a movement of the relief valve stem in an upward direction causes the orifice valve to transition to a closed position and seat against a seat disk and wherein a movement of the relief valve stem in a downward direction causes the orifice valve to transition to an open position and space apart from the seat disk.

13. A pressure regulator comprising:
a diaphragm having an inner edge, the inner edge defining a main relief opening;
a vent limiting component positioned within the main relief opening and adjacent to an upper side of the diaphragm about the inner edge, the vent limiting component including an upper portion, and a lower portion positioned circumferentially about the upper portion, the upper portion defining a tower comprising a hollow cylindrical body, wherein the tower extends from the lower portion through the main relief opening of the diaphragm of the pressure regulator;
a relief valve stem positioned adjacent to a lower side of the diaphragm about the inner edge;
a gasket extending circumferentially about a pressure spring and a relief valve spring; and
wherein the pressure spring configured to provide a force to the vent limiting component to removably secure the vent limiting component to the diaphragm.

14. The pressure regulator of claim 13, wherein the gasket further extends about the inner edge of the diaphragm, the gasket being positioned between a flange of the vent limiting component and the diaphragm, wherein the gasket is positioned on top of a diaphragm plate, which is on top of the diaphragm.

15. The pressure regulator of claim 13, wherein the vent limiting component defines an orifice, wherein the lower side of the diaphragm is in fluid communication with the upper side of the diaphragm through the orifice.

16. The pressure regulator of claim 15, further comprising:
a diaphragm case configured to house the diaphragm, the vent limiting component, the relief valve stem, and the pressure spring within, wherein the pressure regulator has a closed position and an open position, wherein in the closed position an upper portion of the relief valve stem is in contact with a lower surface of the diaphragm substantially preventing the flow of fluid from the lower side of the diaphragm to the upper side of the diaphragm through the orifice, and wherein in the open position the upper portion of the relief valve stem is spaced from the lower surface of the diaphragm allowing fluid communication between the lower side of the diaphragm to the upper side of the diaphragm through the orifice.

17. The pressure regulator of claim 16, wherein the pressure regulator transitions from the closed position to the open position when the pressure exceeds a predetermined pressure threshold on the lower side of the diaphragm.

18. The pressure regulator of claim 17, further comprising a plunger, a lever, and an orifice valve associated with the orifice, wherein the orifice valve is operatively coupled to the plunger and the lever, wherein the lever is coupled to a lower portion of the relief valve stem, wherein a movement of the relief valve stem in an upward direction causes the orifice valve to transition to a closed position and seat against a seat disk and wherein a movement of the relief valve stem in a downward direction causes the orifice valve to transition to an open position and space apart from the seat disk.

* * * * *